US012631767B2

(12) United States Patent
Cheng et al.

(10) Patent No.: US 12,631,767 B2
(45) Date of Patent: May 19, 2026

(54) PROCESSING A GNSS SIGNAL BASED ON DOPPLER ESTIMATES

(71) Applicant: u-blox AG, Thalwil (CH)

(72) Inventors: Zhenlan Cheng, Thalwil (CH); Robert Lluis Garcia, Thalwil (CH); Maxim Koehler, Thalwil (CH)

(73) Assignee: u-blox AG, Thalwil (CH)

( * ) Notice: Subject to any disclaimer, the term of this patent is extended or adjusted under 35 U.S.C. 154(b) by 0 days.

(21) Appl. No.: 18/917,272

(22) Filed: Oct. 16, 2024

(65) Prior Publication Data

US 2025/0123406 A1      Apr. 17, 2025

(30) Foreign Application Priority Data

Oct. 17, 2023      (EP) ..................................... 23204225

(51) Int. Cl.
| | |
|---|---|
| *G01S 19/37* | (2010.01) |
| *G01S 19/29* | (2010.01) |
| *G01S 19/30* | (2010.01) |

(52) U.S. Cl.
CPC .............. *G01S 19/37* (2013.01); *G01S 19/29* (2013.01); *G01S 19/30* (2013.01)

(58) Field of Classification Search
None
See application file for complete search history.

(56) References Cited

U.S. PATENT DOCUMENTS

| | | | | |
|---|---|---|---|---|
| 5,884,214 A * | 3/1999 | Krasner | ..................... | H03J 7/06 |
| | | | | 701/470 |
| 6,125,325 A * | 9/2000 | Kohli | ...................... | G01S 19/34 |
| | | | | 342/357.33 |
| 6,236,937 B1 * | 5/2001 | Kohli | .................. | H04B 1/7085 |
| | | | | 342/357.33 |

(Continued)

FOREIGN PATENT DOCUMENTS

| | | | | |
|---|---|---|---|---|
| CA | 3054421 A1 * | 3/2020 | ............ | G01S 19/115 |
| CA | 3230812 A1 * | 3/2023 | ............ | H03M 13/19 |

(Continued)

OTHER PUBLICATIONS

K. Sun and L. L. Presti, "Channels combining techniques for a novel two steps acquisition of new composite GNSS signals in presence of bit sign transitions," IEEE/ION Position, Location and Navigation Symposium, Indian Wells, CA, USA, 2010, pp. 443-457 (Year: 2010).*

(Continued)

*Primary Examiner* — Berhanu Tadese
(74) *Attorney, Agent, or Firm* — Fish & Richardson P.C.

(57)      ABSTRACT

A method and apparatus are provided for processing a GNSS signal received at a receiver. The GNSS signal may be tracked in different ways in two or more respective operation modes. A first epoch is processed according to a first operation mode. In this mode, a carrier phase of a local carrier signal is controlled to track the carrier phase of the GNSS signal using a phase locked loop. A second epoch is processed according to a second operation mode. In this (Continued)

operation mode, the carrier phase is controlled based at least in part on at least one Doppler estimate. The at least one Doppler estimate depends on inertial measurements made at the receiver.

15 Claims, 5 Drawing Sheets

(56) References Cited

U.S. PATENT DOCUMENTS

| | | | | |
|---|---|---|---|---|
| 6,272,430 B1 * | 8/2001 | Krasner | G01S 19/25 | |
| | | | 342/358 | |
| 6,331,836 B1 * | 12/2001 | Jandrell | G01S 19/29 | |
| | | | 701/478.5 | |
| 6,400,753 B1 * | 6/2002 | Kohli | G01S 19/22 | |
| | | | 375/140 | |
| 6,421,609 B2 * | 7/2002 | Kohli | H04B 1/7085 | |
| | | | 342/357.33 | |
| 6,498,585 B2 * | 12/2002 | Jandrell | G01S 19/29 | |
| | | | 701/518 | |
| 6,542,821 B2 * | 4/2003 | Krasner | G01S 19/42 | |
| | | | 73/178 R | |
| 6,574,558 B2 * | 6/2003 | Kohli | G01S 19/29 | |
| | | | 342/357.33 | |
| 6,633,814 B2 * | 10/2003 | Kohli | H04L 27/30 | |
| | | | 375/E1.032 | |
| 6,650,285 B2 * | 11/2003 | Jandrell | G01S 19/235 | |
| | | | 701/472 | |
| 6,724,811 B2 * | 4/2004 | Kohli | G01S 19/29 | |
| | | | 375/150 | |
| 6,829,534 B2 * | 12/2004 | Fuchs | G01S 19/254 | |
| | | | 342/357.66 | |
| 7,184,464 B2 * | 2/2007 | Abraham | G01S 1/045 | |
| | | | 375/150 | |
| 7,197,064 B2 * | 3/2007 | Loomis | G01S 19/30 | |
| | | | 375/150 | |
| 7,406,114 B2 * | 7/2008 | Kohli | G01S 19/34 | |
| | | | 701/472 | |
| 7,642,959 B2 * | 1/2010 | Abraham | H04B 1/70752 | |
| | | | 342/357.68 | |
| 7,729,413 B2 * | 6/2010 | Kohli | G01S 19/22 | |
| | | | 375/150 | |
| 7,899,402 B2 * | 3/2011 | Sahlin | H04B 7/01 | |
| | | | 455/67.11 | |
| 8,009,092 B2 * | 8/2011 | Abraham | G06F 17/15 | |
| | | | 342/357.65 | |
| 8,013,789 B2 * | 9/2011 | Van Graas | G01S 19/246 | |
| | | | 342/357.65 | |
| 8,022,866 B2 * | 9/2011 | Goldberg | G01S 19/52 | |
| | | | 342/357.35 | |
| 8,031,815 B2 * | 10/2011 | Mattos | H04B 1/70752 | |
| | | | 375/150 | |
| 8,125,381 B2 * | 2/2012 | Bryant | G01S 19/24 | |
| | | | 342/357.59 | |
| 8,212,720 B2 * | 7/2012 | Waters | G01S 19/235 | |
| | | | 342/357.65 | |
| 8,289,205 B2 * | 10/2012 | Waters | G01S 19/254 | |
| | | | 342/357.63 | |
| 8,369,464 B2 * | 2/2013 | Mattos | G01S 19/30 | |
| | | | 375/150 | |
| 8,593,343 B2 * | 11/2013 | Waters | G01S 19/246 | |
| | | | 342/357.62 | |
| 8,816,905 B2 * | 8/2014 | Bryant | G01S 19/25 | |
| | | | 342/357.66 | |
| 9,116,234 B2 * | 8/2015 | Van Dierendonck | H04B 1/707 | |
| 10,816,672 B2 * | 10/2020 | Faragher | G01S 19/29 | |
| 10,866,324 B2 * | 12/2020 | Jardak | G01S 19/32 | |
| 11,378,698 B2 * | 7/2022 | Soualle | G01S 19/254 | |
| 11,513,235 B2 * | 11/2022 | Cheng | G01S 19/52 | |
| 11,579,309 B2 * | 2/2023 | Cheng | G01S 19/243 | |
| 11,686,855 B2 * | 6/2023 | Conflitti | G01S 19/32 | |
| | | | 342/357.25 | |

| | | | | |
|---|---|---|---|---|
| 11,740,362 B2 * | 8/2023 | Marmet | G01S 19/015 | |
| | | | 701/469 | |
| 12,386,078 B2 * | 8/2025 | Krasner | G01S 19/30 | |
| 12,442,931 B2 * | 10/2025 | Conflitti | G01S 19/30 | |
| 2001/0002458 A1 * | 5/2001 | Kohli | H04B 1/709 | |
| | | | 342/357.33 | |
| 2002/0015439 A1 * | 2/2002 | Kohli | G01C 22/00 | |
| | | | 375/150 | |
| 2002/0044087 A1 * | 4/2002 | Krasner | G01S 5/0054 | |
| | | | 342/357.64 | |
| 2002/0143467 A1 * | 10/2002 | Kohli | G01C 22/00 | |
| | | | 342/357.33 | |
| 2002/0146065 A1 * | 10/2002 | Kohli | H04B 1/709 | |
| | | | 375/150 | |
| 2003/0139879 A1 * | 7/2003 | Krasner | G01S 19/37 | |
| | | | 701/483 | |
| 2003/0154025 A1 * | 8/2003 | Fuchs | G01S 19/072 | |
| | | | 342/357.66 | |
| 2003/0219066 A1 * | 11/2003 | Abraham | G01S 1/045 | |
| | | | 375/150 | |
| 2004/0077365 A1 * | 4/2004 | Abraham | G01S 19/22 | |
| | | | 455/507 | |
| 2004/0136446 A1 * | 7/2004 | Kohli | G01S 19/22 | |
| | | | 375/150 | |
| 2004/0202235 A1 * | 10/2004 | Kohli | G01C 22/00 | |
| | | | 375/150 | |
| 2006/0071851 A1 * | 4/2006 | Graas | G01S 19/29 | |
| | | | 342/357.395 | |
| 2007/0040740 A1 * | 2/2007 | Abraham | G01S 19/26 | |
| | | | 375/E1.006 | |
| 2007/0160121 A1 * | 7/2007 | Abraham | G01S 19/254 | |
| | | | 375/150 | |
| 2009/0315770 A9 * | 12/2009 | Abraham | G01S 19/254 | |
| | | | 375/150 | |
| 2010/0066605 A1 * | 3/2010 | Goldberg | G01S 19/52 | |
| | | | 342/357.29 | |
| 2010/0066607 A1 * | 3/2010 | Abraham | G01S 19/256 | |
| | | | 342/357.73 | |
| 2010/0073227 A1 * | 3/2010 | Waters | G01S 19/26 | |
| | | | 342/357.48 | |
| 2011/0021171 A1 * | 1/2011 | Sturza | G01S 19/246 | |
| | | | 455/334 | |
| 2011/0241937 A1 * | 10/2011 | Choi | G01S 19/30 | |
| | | | 342/357.69 | |
| 2015/0036724 A1 * | 2/2015 | Van Dierendonck | G01S 19/42 | |
| | | | 375/147 | |
| 2016/0377729 A1 * | 12/2016 | Jardak | G01S 19/33 | |
| | | | 342/357.27 | |
| 2017/0068001 A1 * | 3/2017 | Chhokra | G01S 19/428 | |
| 2019/0086552 A1 * | 3/2019 | Tuck | G01S 19/19 | |
| 2019/0353800 A1 * | 11/2019 | Nirula | G01S 19/40 | |
| 2022/0276389 A1 * | 9/2022 | Yu | G01S 19/21 | |
| 2023/0176227 A1 * | 6/2023 | Cheng | G01S 19/05 | |
| | | | 455/456.1 | |
| 2023/0305170 A1 * | 9/2023 | Conflitti | G01S 19/30 | |
| 2023/0375659 A1 * | 11/2023 | Neinavaie | G01S 7/021 | |
| 2023/0393286 A1 * | 12/2023 | Conflitti | G01S 19/37 | |
| 2024/0134057 A1 * | 4/2024 | Bartlett | G01S 5/0036 | |
| 2024/0402350 A1 * | 12/2024 | Peng | G01S 19/07 | |
| 2025/0123406 A1 * | 4/2025 | Cheng | G01S 19/29 | |
| 2025/0123407 A1 * | 4/2025 | Cheng | G01S 19/37 | |
| 2025/0123408 A1 * | 4/2025 | Cheng | G01S 19/37 | |
| 2025/0251519 A1 * | 8/2025 | Cheng | G01S 19/37 | |

FOREIGN PATENT DOCUMENTS

| | | | | |
|---|---|---|---|---|
| CN | 102033236 B | * | 9/2012 | |
| CN | 103777216 A | * | 5/2014 | G01S 19/24 |
| CN | 104280746 | | 1/2015 | |
| CN | 104459731 A | * | 3/2015 | G01S 19/246 |
| CN | 105954772 A | * | 9/2016 | G01S 19/24 |
| CN | 106019333 A | * | 10/2016 | G01S 19/32 |
| CN | 104459731 B | * | 1/2017 | G01S 19/246 |
| CN | 106526635 A | * | 3/2017 | G01S 19/37 |
| CN | 106646548 A | * | 5/2017 | G01S 19/33 |
| CN | 107479071 A | * | 12/2017 | G01S 19/30 |
| CN | 105954772 B | * | 4/2018 | G01S 19/24 |

(56)     References Cited

FOREIGN PATENT DOCUMENTS

| | | | | | |
|---|---|---|---|---|---|
| CN | 106019333 B | * | 8/2018 | ............ | G01S 19/37 |
| CN | 108415042 A | * | 8/2018 | ............ | G01S 19/29 |
| CN | 108646543 A | * | 10/2018 | ............ | G04R 20/02 |
| CN | 106526635 B | * | 2/2019 | ............ | G01S 19/37 |
| CN | 109307878 | | 2/2019 | | |
| CN | 109564293 A | * | 4/2019 | ............ | G01S 19/29 |
| CN | 109581435 A | * | 4/2019 | ............ | G01S 19/30 |
| CN | 109085627 B | * | 7/2019 | ............ | G01S 19/44 |
| CN | 110515103 A | * | 11/2019 | ............ | G01S 19/41 |
| CN | 106646548 B | * | 3/2020 | ............ | G01S 19/33 |
| CN | 111158022 A | * | 5/2020 | ............ | G01S 19/256 |
| CN | 111158023 A | * | 5/2020 | ............ | G01S 19/30 |
| CN | 111788497 A | * | 10/2020 | ............ | G01S 19/254 |
| CN | 108646543 B | * | 11/2020 | ............ | G04R 20/02 |
| CN | 111158022 B | * | 11/2020 | ............ | G01S 19/21 |
| CN | 111158023 B | * | 11/2020 | ............ | G01S 19/29 |
| CN | 112166346 A | * | 1/2021 | ............ | G01S 19/22 |
| CN | 112505730 A | * | 3/2021 | ............ | G01S 19/30 |
| CN | 113109850 A | * | 7/2021 | ............ | G01S 19/42 |
| CN | 108415042 B | * | 10/2021 | ............ | G01S 19/43 |
| CN | 111025336 B | * | 3/2022 | ............ | G01S 19/29 |
| CN | 114114360 A | * | 3/2022 | ............ | G01S 19/43 |
| CN | 114114360 B | * | 5/2022 | ............ | G01S 19/43 |
| CN | 114556286 A | * | 5/2022 | ............ | G01S 19/32 |
| CN | 113109850 B | * | 7/2022 | ............ | G01S 19/42 |
| CN | 114814904 A | * | 7/2022 | ............ | G01S 19/29 |
| CN | 115291249 A | * | 11/2022 | ............ | G01S 19/254 |
| CN | 115876169 A | * | 3/2023 | | |
| CN | 109564293 B | * | 9/2023 | ............ | G01S 19/29 |
| CN | 116745647 A | * | 9/2023 | ............ | G01S 19/30 |
| CN | 116990843 A | * | 11/2023 | ............ | G01S 19/40 |
| CN | 117092669 A | * | 11/2023 | ............ | G01S 19/24 |
| CN | 117092669 B | * | 3/2024 | ............ | G01S 19/24 |
| CN | 112166346 B | * | 4/2024 | ............ | G01S 19/22 |
| CN | 115291249 B | * | 11/2024 | ............ | G01S 19/254 |
| CN | 114814904 B | * | 12/2024 | ............ | G01S 19/396 |
| CN | 119846669 A | * | 4/2025 | ............ | G01S 19/47 |
| CN | 119846670 A | * | 4/2025 | ............ | G01S 19/47 |
| CN | 114556286 B | * | 8/2025 | ............ | G01S 19/32 |
| CN | 120446991 A | * | 8/2025 | ............ | G01S 19/37 |
| CN | 120929406 A | * | 11/2025 | ............ | G01S 19/32 |
| DE | 102009044731 A1 | * | 6/2010 | ............ | G01S 19/11 |
| EP | 1209483 A2 | * | 5/2002 | ............ | G01S 19/30 |
| EP | 1271102 A2 | * | 1/2003 | ............ | G01S 19/29 |
| EP | 1724602 A1 | * | 11/2006 | ............ | G01S 19/32 |
| EP | 1581820 B1 | * | 10/2011 | ............ | G01S 5/0036 |
| EP | 1724602 B1 | * | 4/2014 | ............ | G01S 19/32 |
| EP | 3109673 A1 | * | 12/2016 | ............ | G01S 19/37 |
| EP | 3502745 A1 | * | 6/2019 | ............ | G01S 19/215 |
| EP | 3109673 B1 | * | 1/2020 | ............ | G01S 19/44 |
| EP | 3620824 A1 | * | 3/2020 | ............ | G01S 19/115 |
| EP | 3620824 B1 | * | 3/2023 | ............ | G01S 19/072 |
| EP | 4357815 A1 | * | 4/2024 | ............ | G01S 19/37 |
| EP | 3488265 B1 | * | 12/2024 | ............ | G01S 19/52 |
| EP | 4542260 A1 | * | 4/2025 | ............ | G01S 19/47 |
| EP | 4542261 A1 | * | 4/2025 | ............ | G01S 19/47 |
| EP | 4542262 A1 | * | 4/2025 | ............ | G01S 19/47 |
| EP | 4600700 A1 | * | 8/2025 | ............ | G01S 19/37 |
| EP | 3649486 B1 | * | 9/2025 | ............ | G01S 19/05 |
| EP | 4150379 B1 | * | 10/2025 | ............ | G01S 19/40 |
| JP | 2017122713 A | * | 7/2017 | ............ | G01S 19/36 |
| JP | 2020043562 A | * | 3/2020 | ............ | G01S 19/115 |
| KR | 20120051854 A | * | 5/2012 | ............ | G01S 19/254 |
| KR | 20170000805 A | * | 1/2017 | ............ | G01S 19/32 |
| KR | 101844659 B1 | * | 4/2018 | ............ | G01S 19/33 |
| KR | 20220079656 A | * | 6/2022 | ............ | G01S 19/32 |
| KR | 20230031239 A | * | 3/2023 | ............ | G01S 19/46 |
| WO | WO-0216961 A2 | * | 2/2002 | ............ | G01S 19/29 |
| WO | WO-2004063763 A1 | * | 7/2004 | ............ | G01S 19/27 |
| WO | WO-2004086077 A1 | * | 10/2004 | .......... | G01S 5/0205 |
| WO | WO-2006064310 A1 | * | 6/2006 | ............... | H04B 7/01 |
| WO | WO-2013016800 A1 | * | 2/2013 | ............ | G01S 19/42 |
| WO | WO-2018014980 A1 | * | 1/2018 | ............ | G01S 19/29 |
| WO | WO-2019121135 A1 | * | 6/2019 | .......... | G01S 19/254 |
| WO | WO-2019219218 A1 | * | 11/2019 | ............ | G01S 19/22 |
| WO | WO-2021076518 A1 | * | 4/2021 | ............ | G01S 19/32 |
| WO | WO-2022125173 A2 | * | 6/2022 | ............ | G01S 7/021 |
| WO | WO-2021247584 A9 | * | 2/2023 | ............ | G01S 19/30 |
| WO | WO-2023158508 A1 | * | 8/2023 | ............ | G01S 19/21 |
| WO | WO-2024064023 A1 | * | 3/2024 | ............ | G01S 19/30 |
| WO | WO-2024248947 A1 | * | 12/2024 | .......... | G01S 19/073 |

OTHER PUBLICATIONS

N. Linty and L. Lo Presti, "Doppler Frequency Estimation in GNSS Receivers Based on Double FFT," in IEEE Transactions on Vehicular Technology, vol. 65, No. 2, pp. 509-524, Feb. 2016. (Year: 2016).*

Y.T. Jade Morton; R. Yang; B. Breitsch, "GNSS Receiver Signal Tracking," in Position, Navigation, and Timing Technologies in the 21st Century: Integrated Satellite Navigation, Sensor Systems, and Civil Applications , IEEE, 2021, pp. 339-375, (Year: 2021).*

L. Li, J. Zhong and M. Zhao, "Doppler-Aided GNSS Position Estimation With Weighted Least Squares," in IEEE Transactions on Vehicular Technology, vol. 60, No. 8, pp. 3615-3624, Oct. 2011, (Year: 2011).*

K. Sun, "Composite GNSS signal acquisition in presence of data sign transition," 2010 International Conference on Indoor Positioning and Indoor Navigation, Zurich, Switzerland, 2010, pp. 1-9, (Year: 2010).*

Chun Yang, "Navigation with Terrestrial Digital Broadcasting Signals," in Position, Navigation, and Timing Technologies in the 21st Century: Integrated Satellite Navigation, Sensor Systems, and Civil Applications , IEEE, 2021, pp. 1243-1280 (Year: 2021).*

Mohinder S. Grewal; Angus P. Andrews; Chris G. Bartone, "GNSS Receiver Design and Analysis," in Global Navigation Satellite Systems, Inertial Navigation, and Integration , Wiley, 2020, pp. 189-247, (Year: 2020).*

Mohinder S. Grewal; Angus P. Andrews; Chris G. Bartone, "GNSS Measurement Errors," in Global Navigation Satellite Systems, Inertial Navigation, and Integration , Wiley, 2020, pp. 249-292 (Year: 2020).*

Extended European Search Report in European Appln. No. 23204225.9, mailed on Apr. 16, 2024, 13 pages.

Wu et al., "An INS-aided GPS fast acquisition algorithm for high dynamic applications," IEEE International Conference on Imaging Systems and Techniques, Oct. 18, 2017, 1-6.

Yang et al., "Improving GPS receiver tracking performance of PLL by MEMS IMU aiding," Proceedings of the 19th International Technical Meeting of the Satellite Division of The Institute of Navigation, Sep. 29, 2006, 2192-2201.

Zhou et al., "A novel design of an adaptive hybrid low-cost GPS/INS integration system," Proceedings of the 2008 National Technical Meeting of the Institute of Navigation, Jan. 30, 2008, 521-531.

* cited by examiner

PROCESSING A GNSS SIGNAL BASED ON DOPPLER ESTIMATES

CROSS-REFERENCE TO RELATED APPLICATIONS

This application claims priority to European Application No. EP23204225.9, filed on Oct. 17, 2023, the contents of which are incorporated herein by reference in their entirety.

FIELD OF THE INVENTION

The present invention relates to Global Navigation Satellite Systems (GNSS). In particular, it relates to using Doppler estimates to support long coherent integration of GNSS signals.

BACKGROUND OF THE INVENTION

Techniques for GNSS positioning are well known in the art. Existing GNSS include the Global Positioning System (GPS), Galileo, GLONASS, and BeiDou Navigation Satellite System (BDS), also referred to herein as simply "BeiDou". Each GNSS comprises a constellation of satellites, also known in the art as "space vehicles" (SVs), which orbit the earth. Typically, each SV transmits a number of satellite signals. These are received by a GNSS receiver whose position it is desired to calculate. The GNSS receiver can make a number of ranging measurements using the signals, to derive information about the distance between the receiver and respective satellites. When a sufficient number of measurements can be made, the receiver's position can then be calculated by multilateration.

In order to make a GNSS measurement, it is necessary to acquire and track the relevant GNSS signal. While this may be relatively easy under open sky conditions, it may become more challenging under more difficult signal reception conditions. Multipath conditions may present particular difficulties. The accuracy of the position calculation depends on the accuracy of the ranging measurements. However, when significant multipath is present, the GNSS receiver may acquire and track a reflected version of the satellite signal, rather than the direct "line of sight" (LoS) signal. The reflected version is likely to have a different path length and therefore will produce a different ranging measurement, which may corrupt or degrade the accuracy of the resulting position fix.

Under challenging signal reception conditions, the LoS may be received weakly. Therefore, in order to successfully acquire and track the LoS signal, the receiver sensitivity should be as high as possible. Increasing the receiver sensitivity increases the likelihood of being able to detect the LoS GNSS signal, which in turn increases the likelihood of being able to reject multipath.

One way of increasing sensitivity is to increase the coherent integration time at the receiver.

SUMMARY OF THE INVENTION

It would be desirable to make the receiver more sensitive to GNSS signals. In particular, it would be desirable to increase the maximum coherent integration time that may be used by the receiver. However, as the coherent integration time is increased, the integration becomes more susceptible to changes in the speed or direction of travel of the GNSS receiver. Sudden acceleration may cause the receiver to lose its lock on the GNSS signal. Even if lock is not lost, the effect on the calculations may be such that the benefit of increasing the coherent integration period is lost.

The present inventors have recognised that knowledge of changes in speed and orientation can be used to mitigate the negative effects of dynamic motion on the coherent integration. Inertial measurements can be used to compensate for the motion, when detecting GNSS signals and obtaining GNSS measurements from them.

A method and apparatus are provided for processing a GNSS signal received at a receiver. A carrier phase of a local carrier signal is initialised for the current epoch based on a first Doppler estimate. The first Doppler estimate is derived from a measurement gathered in the previous epoch. The carrier phase is updated repeatedly for the current epoch while the GNSS signal is being mixed with the local carrier signal. The updating relies on second Doppler estimates, which are based on inertial measurements made at the receiver.

Additionally, a method and apparatus are provided for processing a GNSS signal received at a receiver. The GNSS signal may be tracked in different ways in two or more respective operation modes. A first epoch is processed according to a first operation mode. In this mode, a carrier phase of a local carrier signal is controlled to track the carrier phase of the GNSS signal using a phase locked loop. A second epoch is processed according to a second operation mode. In this operation mode, the carrier phase is controlled based at least in part on at least one Doppler estimate. The at least one Doppler estimate depends on inertial measurements made at the receiver.

According to a first aspect of the present disclosure, there is provided a method of processing a GNSS signal received at a receiver at a current epoch, based on information derived at least in part from a previous epoch, comprising:

obtaining samples of the GNSS signal for the current epoch, for a first spreading code iteration of the current epoch:

obtaining a first Doppler estimate for the GNSS signal, wherein the first Doppler estimate is derived from the previous epoch;

initialising a carrier phase of a local carrier signal for the current epoch based on the first Doppler estimate;

mixing the local carrier signal with a first plurality of the samples to generate first carrier-free signal samples; and correlating the first carrier-free signal samples with a local spreading code to generate a first complex-valued correlation result for the current epoch, for each of a plurality of subsequent spreading code iterations of the current epoch:

obtaining a second Doppler estimate for the GNSS signal, wherein the second Doppler estimate is based on inertial measurements made at the receiver;

updating the carrier phase of the local carrier signal based on the second Doppler estimate;

mixing the local carrier signal with a second plurality of the samples to generate second carrier-free signal samples; and correlating the second carrier-free signal samples with the local spreading code to generate a second complex-valued correlation result, the method further comprising processing the first and second complex-valued correlation results to produce at least one of: an indication of whether the GNSS signal is detected or not; and a GNSS measurement for the current epoch.

According to the method as summarised above, multiple second Doppler estimates are obtained for each first Doppler estimate (since multiple second Doppler estimates are obtained for each epoch). An interval between receipt of successive first Doppler estimates may correspond to an interval between successive epochs. An interval between receipt of successive second Doppler estimates may be shorter than the interval between epochs. The first Doppler estimates may be obtained at a first rate and the second Doppler estimates may be obtained at a second rate, wherein the second rate is greater than the first rate. The first rate may be greater than 0.25 Hz and less than 4 Hz, optionally 1 Hz, for example. The second rate may be greater than 10 Hz, or greater than 25 Hz. The second rate may be less than 100 Hz, or less than 75 Hz. The second rate may be 50 Hz, for example.

The local carrier signal may also be referred to as a carrier replica or replica carrier signal. The local spreading code may also be referred to as a spreading code replica or replica spreading code.

The indication of whether the GNSS signal is detected or not may be useful in an acquisition phase or a re-acquisition phase. Re-acquisition may be required when a car exits a tunnel for instance, or in a hot-start scenario when the receiver is turned off for a short time and restarted while the timing can still be maintained precisely. In both cases, the lock on the GNSS signal is lost, but the receiver is able to predict the delay and Doppler quite precisely for the near future.

The method may further comprise, for the first iteration of the spreading code: obtaining a code phase estimate for the GNSS signal, wherein the code phase estimate is derived from the navigation solution for the previous epoch; and initialising a code phase of the local spreading code for the current epoch based on the code phase estimate, and for each of the plurality of subsequent spreading code iterations: updating the code phase of the local spreading code based on the second Doppler estimate.

Processing the first and second complex-valued correlation results optionally comprises coherently integrating the first and second complex-valued correlation results.

The GNSS measurement may be based on a result of the coherent integration. The coherent integration may comprise integrating over at least 0.25 s, at least 0.5 s, at least 1 s, or at least 2 s. It may comprise integrating over less than 10 s, less than 5 s, or less than 4 s. (All combinations of these endpoints are hereby disclosed.)

Processing the first and second complex-valued correlation results optionally comprises performing a discrete Fourier transform, DFT, on the first and second complex-valued correlation results. The GNSS measurement may be based on a result of the DFT. For example, the GNSS measurement may comprise a Doppler frequency and code-phase delay which are derived by finding a peak in one or more of the DFT results.

Correlating the first and second mixed signal samples with the local spreading code optionally comprises correlating them with an early version of the local spreading code and a late version of the local spreading code. Typically, the correlating also comprises correlating the mixed signal samples with a prompt version of the spreading code. The coherent integration (in particular, the DFT) may be applied separately to the results of the late, prompt, and early correlations.

The GNSS measurement optionally comprises a code phase of the GNSS signal, wherein processing the first and second complex-valued correlation results optionally comprises determining the code phase of the GNSS signal based on the first and second complex-valued correlation results.

The method may further comprise calculating a navigation solution based on the determined code phase, wherein the navigation solution includes a new first Doppler estimate for use in a later epoch.

The method may further comprise estimating a rate of change of the second Doppler estimates; and extrapolating third Doppler estimates from the second Doppler estimates, wherein the third Doppler estimates are extrapolated based on the estimated rate of change, wherein updating the carrier phase comprises updating the carrier phase based on the third Doppler estimates.

The third Doppler estimates may be extrapolated based on the rate of change of the second Doppler estimates and a measurement latency associated with the inertial measurements.

In some instances, the first Doppler estimate may be derived from a navigation solution for the previous epoch. The navigation solution may be provided by a positioning engine (PE). The positioning engine may be configured to process GNSS measurements to produce the navigation solution. The navigation solution may comprise a state vector. The positioning engine may be configured to estimate the state vector at each epoch. The state vector may comprise a plurality of state variables, the state variables including one or more Doppler estimates, and optionally including one or more of: position variables, velocity variables, and time variables.

In some instances, the first Doppler estimate may be derived from the previous epoch using a phase locked loop. In this case, the Doppler estimate may be provided within a measurement engine (ME). The measurement engine may be configured to produce GNSS measurements, but not to process those measurements to produce a navigation solution. The Doppler estimate may be derived by comparing a phase of the local carrier signal with a phase of a carrier of the GNSS signal.

Also provided according to the first aspect is a computer program comprising computer program code configured to cause one or more physical computing devices to perform all the steps of a method as summarized above when said computer program is run on said one or more physical computing devices. The one or more physical computing devices may comprise or consist of one or more processors of a GNSS receiver. The computer program may be stored on a computer-readable medium (optionally non-transitory).

Also provided according to the first aspect is a Global Navigation Satellite System, hereinafter GNSS, receiver, configured to process a GNSS signal received at a current epoch, based on information derived at least in part from a previous epoch, the GNSS receiver comprising a measurement engine configured to:

obtain samples of the GNSS signal for the current epoch, for a first spreading code iteration of the current epoch:

obtain a first Doppler estimate for the GNSS signal, wherein the first Doppler estimate is derived from the previous epoch;

initialise a carrier phase of a local carrier signal for the current epoch based on the first Doppler estimate;

mix the local carrier signal with a first plurality of the samples to generate first carrier-free signal samples; and correlate the first carrier-free signal samples with a local spreading code to generate a first complex-valued correlation result for the current epoch, for each of a plurality of subsequent spreading code iterations of the current epoch:

obtain a second Doppler estimate for the GNSS signal, wherein the second Doppler estimate is based on inertial measurements made at the receiver;

update the carrier phase of the local carrier signal based on the second Doppler estimate;

mix the local carrier signal with a second plurality of the samples to generate second carrier-free signal samples; and correlating the second carrier-free signal samples with the local spreading code to generate a second complex-valued correlation result, the method further comprising processing the first and second complex-valued correlation results to produce at least one of: an indication of whether the GNSS signal is detected or not; and a GNSS measurement for the current epoch.

The GNSS receiver may further comprise: an RF front-end, for receiving the GNSS signal, and for down-converting and digitising the GNSS signals; and a mixer for wiping off a residual carrier from the signals. The GNSS receiver may further comprise an intermediate-frequency (IF) processing unit, for processing the signals down-converted from RF to IF by the RF front-end. An output of the RF front-end may be coupled to an input of the intermediate-frequency processing unit. An output of the IF processing unit may be coupled to an input of the mixer.

The GNSS receiver may further comprise at least a first correlator, coupled to an output of the mixer, configured to wipe off a spreading code of the GNSS signal. The first correlator may be part of a bank of correlators, including early, prompt, and late correlators.

One or more outputs of the first correlator may be coupled to at least one tracking loop, including one or both of a code tracking loop and a carrier tracking loop.

The at least one tracking loop may comprise a code-phase feedback controller configured to estimate the code phase of the GNSS signal; the GNSS receiver may further comprise a code generator, configured to generate the local spreading code. The code generator may be controlled at least in part based on the second Doppler estimates.

The code generator may comprise a numerically controlled oscillator (NCO), configured to generate a clock signal for generating the local spreading code.

The code generator may provide an input to the correlator to enable it to wipe off the spreading code of the GNSS signal.

The GNSS receiver may further comprise a carrier generator, configured to generate a local carrier signal for wiping off the residual carrier from the GNSS signal. The carrier generator may comprise an NCO configured to generate the local carrier signal.

According to a second aspect of the present disclosure, there is provided a method of processing a GNSS signal received at a receiver, comprising:

for a first epoch:

obtaining first samples of the GNSS signal;

generating a local carrier signal;

mixing the local carrier signal with the first samples to generate first carrier-free signal samples;

generating a local spreading code;

correlating the first carrier-free signal samples with the local spreading code to generate first complex-valued correlation results for the first epoch; and processing the first complex-valued correlation results to produce at least one of: a first indication of whether the GNSS signal is detected or not; and a first GNSS measurement for the first epoch, wherein, during the mixing for the first epoch, a carrier phase of the local carrier signal is controlled to track a carrier phase of the GNSS signal using a phase locked loop, and for a second epoch:

obtaining second samples of the GNSS signal, obtaining at least one Doppler estimate for the GNSS signal, wherein the at least one Doppler estimate is based on inertial measurements made at the receiver, mixing the local carrier signal with the second samples to generate second carrier-free signal samples;

correlating the second carrier-free signal samples with the local spreading code to generate second complex-valued correlation results for the second epoch; and processing the second complex-valued correlation results to produce at least one of: a second indication of whether the GNSS signal is detected or not; and a second GNSS measurement for the second epoch, wherein, during the mixing for the second epoch, the carrier phase of the local carrier signal is controlled based at least in part on the at least one Doppler estimate.

According to embodiments of this method, a GNSS receiver is capable of tracking the code phase and/or carrier phase of the GNSS signal in at least two different ways. These two ways may be employed at different times.

It should be understood that the designations "first" epoch and "second" epoch merely require that there are two different epochs. The "first" epoch could be before or after the "second" epoch. The first and second epochs may be successive epochs or there may be one or more other epochs (potentially many epochs) between the first and second epochs.

The first method of tracking (corresponding to the first epoch above) involves tracking using a phase locked loop and/or a delay locked loop. This method need not rely on a navigation solution to the track the code phase and/or carrier phase.

The second method of tracking (corresponding to the second epoch above) involves tracking using a Doppler estimate that is based on inertial measurements. The Doppler estimate may be initialised for the second epoch based on a navigation solution. The navigation solution may be based on GNSS measurements and the inertial measurements. The Doppler estimate may be updated for the second epoch based on the inertial measurements. The updates based on the inertial measurements may occur at shorter intervals than an interval between epochs.

The indications of whether the GNSS signal is detected or not may be useful in an acquisition phase or a re-acquisition phase. Re-acquisition may be required when a car exits a tunnel for instance, or in a hot-start scenario when the receiver is turned off for a short time and restarted while the timing can still be maintained precisely. In both cases, the lock on the GNSS signal is lost, but the receiver is able to predict the delay and Doppler quite precisely for the near future.

It should be understood that the references to "first" and the "second" epochs are merely labels. They are not necessarily consecutive epochs. Furthermore, the first epoch may be before or after the second epoch, in time.

Processing the first complex-valued correlation results optionally comprises coherently integrating them over a first coherent integration interval. Processing the second complex-valued correlation results optionally comprises coherently integrating them over a second coherent integration interval. The second coherent integration interval may be longer than the first coherent integration interval.

The GNSS measurement may be based on a result of the coherent integration. The second coherent integration interval may be at least 0.25 s, at least 0.5 s, at least 1 s, or at least 2 s. It may be less than 10 s, less than 5 s, or less than 4 s. (All combinations of these endpoints are hereby disclosed.)

Increasing the coherent integration interval may help to increase the sensitivity of the GNSS receiver, making it possible to receive and use GNSS signals in more challenging signal environments. However, fast dynamics of the receiver can reduce the useful information available from a longer coherent integration interval. By using a method according to an example of the present disclosure, the coherent integration interval may be lengthened even when it is not possible to track the signal using the PLL and DLL. This can be achieved by using the inertial measurements to compensate for the motion of the receiver, during the long coherent integration interval.

The at least one Doppler estimate optionally comprises a plurality of Doppler estimates provided at intervals that are shorter than the interval between successive epochs.

The plurality of Doppler estimates optionally comprises: a first Doppler estimate, based on an earlier epoch, preceding the second epoch; and a plurality of second Doppler estimates, based on inertial measurements for the second epoch.

The first Doppler estimate may be provided once per epoch. The second Doppler estimates may be provided at intervals that are shorter than the interval between successive epochs.

The first Doppler estimates may be obtained at a first rate and the second Doppler estimates may be obtained at a second rate, wherein the second rate is greater than the first rate. The first rate may be greater than 0.25 Hz and less than 4 Hz, optionally 1 Hz, for example. The second rate may be greater than 10 Hz, or greater than 25 Hz. The second rate may be less than 100 Hz, or less than 75 Hz. The second rate may be 50 Hz, for example.

In some instances, the first Doppler estimate may be derived from a navigation solution for the earlier epoch. The navigation solution may be provided by a positioning engine (PE). The positioning engine may be configured to process GNSS measurements to produce the navigation solution. The navigation solution may comprise a state vector. The positioning engine may be configured to estimate the state vector at each epoch. The state vector may comprise a plurality of state variables, the state variables including one or more Doppler estimates, and optionally including one or more of: position variables, velocity variables, and time variables.

In some instances, the first Doppler estimate may be derived from the previous epoch using a phase locked loop. In this case, the Doppler estimate may be provided within a measurement engine (ME). The measurement engine may be configured to produce GNSS measurements, but not to process those measurements to produce a navigation solution. The Doppler estimate may be derived by comparing a phase of the local carrier signal with a phase of a carrier of the GNSS signal.

Optionally, during the correlating for the first epoch, a code phase of the local spreading code may be controlled to track a code phase of the GNSS signal using a delay locked loop.

Optionally, during the correlating for the second epoch, a code phase of the local spreading code is controlled based at least in part on the at least one Doppler estimate.

A code phase of the local spreading code may be initialised for the second epoch based on a navigation solution for an earlier epoch, preceding the second epoch.

Optionally, the receiver has a first mode of operation and a second mode of operation, wherein the first mode is active for the first epoch and the second mode is active for the second epoch. The first mode may be selected responsive to detecting good quality signal reception conditions and the second mode may be selected responsive to detecting poor quality signal reception conditions.

In some embodiments, good quality signal reception conditions may be distinguished from poor quality signal reception conditions by examining quality metrics such as carrier-to-noise-density ratio ($C/N_0$), carrier phase lock, or residuals. For example, if $C/N_0$ is greater than 37 dB-Hz, or if carrier phase lock is intact, or if the residual is below a predetermined threshold, the signal reception conditions may be categorized as being of good quality.

The residual is the difference between (i) the estimated distance from the receiver to the respective satellite and (ii) the actual range measurement. When the residual is low, it indicates good consistency between the range measurement for the current satellite of interest and those for the other satellites.

In some examples the selection of the mode may be made independently for different GNSS signals. For instance, a GNSS signal from one satellite may be tracked using the first mode and a GNSS signal from another satellite may be tracked using the second mode. This situation may arise if one satellite signal is received with higher quality than the other.

The method may comprise, for the second epoch, comparing a first carrier phase estimate produced by the phase locked loop with a second carrier phase estimate derived from the at least one Doppler estimate; responsive to determining that a difference between the first carrier phase estimate and the second carrier phase estimate is not greater than a threshold phase difference, initialising the carrier phase of the local carrier signal for the second epoch based on the first carrier phase estimate; and responsive to determining that the difference is greater than the threshold phase difference, initialising the carrier phase of the local carrier signal for the second epoch based on the second carrier phase estimate.

This may be seen as a hybrid of two ways of initialising the carrier phase. The second carrier phase estimate (based on the Doppler estimate, which is based on inertial measurements) can act as a crosscheck on the first carrier phase estimate, produced by the phase locked loop. Provided that the phase locked loop is properly locked to the GNSS signal, it may produce more reliable estimates of carrier phase. When the first carrier phase estimate (produced by the PLL) deviates significantly from the second carrier phase estimate, this may indicate that the PLL no longer has a good lock on the signal. In these circumstances, the second carrier phase estimate (based on the Doppler estimate) may be more reliable than the first carrier phase estimate (produced by the PLL).

The method may comprise, for the second epoch, comparing a first code phase estimate produced by the delay locked loop with a second code phase estimate derived from the at least one Doppler estimate; responsive to determining that a difference between the first code phase estimate and the second code phase estimate is not greater than a threshold delay difference, initialising the code phase of the local spreading code for the second epoch based on the first code phase estimate; and responsive to determining that the difference is greater than the threshold delay difference, initialising the code phase of the local spreading code for the second epoch based on the second code phase estimate.

Optionally, during the mixing for the second epoch, the carrier phase of the local carrier signal is controlled based at least in part on the at least one Doppler estimate. Optionally, during the correlating for the second epoch, a code phase of the local spreading code is controlled based at least in part on the at least one Doppler estimate. The method may further comprise, for a third epoch: obtaining third samples of the GNSS signal; obtaining at least one Doppler estimate for the GNSS signal, wherein the at least one Doppler estimate is based on inertial measurements made at the receiver; obtaining a carrier phase estimate based on the at least one Doppler estimate; obtaining a code phase estimate based on the at least one Doppler estimate; selecting between the carrier phase estimate based on the at least one Doppler estimate and a carrier phase estimate produced by the phase locked loop; mixing the local carrier signal with the third samples to generate third carrier-free signal samples, wherein the carrier phase of the local carrier signal is controlled based on the selected carrier phase estimate; selecting between the code phase estimate based on the at least one Doppler estimate and a code phase estimate produced by a delay locked loop; correlating the third carrier-free signal samples with the local spreading code to generate third complex-valued correlation results for the third epoch, wherein the code phase of the local spreading code is controlled based on the selected code phase estimate; and processing the third complex-valued correlation results to produce at least one of: a third indication of whether the GNSS signal is detected or not; and a third GNSS measurement for the third epoch.

For the second epoch, the carrier phase and code phase may be controlled unconditionally based on the at least one Doppler estimate.

For the third epoch, the carrier phase may be controlled based on either the PLL or the at least one Doppler estimate, depending on predetermined conditions. Likewise, the code phase may be controlled based on either the DLL or the at least one Doppler estimate, depending on predetermined conditions. In particular, the selection may be made based on a difference between the respective estimates, in the manner summarised previously above.

The receiver may have a third mode of operation, wherein the third mode is active for the third epoch. The third mode may be selected responsive to detecting poor quality signal reception conditions. The third mode may be selected in preference to the second mode when sufficient resources are available. For example, the third mode may be selected in preference to the second mode when a mobile device has sufficient battery power to support the additional computational demands of the third mode.

In some examples, only one of the second mode and the third mode might be implemented. Therefore, the selection of the mode may be between the first and second modes only, or between the second and third modes only.

Processing the complex-valued correlation results optionally comprises performing a discrete Fourier transform (DFT) on them. The GNSS measurement may be based on a result of the DFT. For example, the GNSS measurement may comprise a Doppler frequency and code-phase delay which are derived by finding a peak in one or more of the DFT results.

Also provided according to the second aspect is a computer program comprising computer program code configured to cause one or more physical computing devices to perform all the steps of a method as summarized above when said computer program is run on said one or more physical computing devices. The one or more physical computing devices may comprise or consist of one or more processors of a GNSS receiver. The computer program may be stored on a computer-readable medium (optionally non-transitory).

Also provided according to the second aspect is a Global Navigation Satellite System, hereinafter GNSS, receiver, configured to process a GNSS signal, the GNSS receiver comprising a measurement engine configured to:

for a first epoch:

obtain first samples of the GNSS signal;

generate a local carrier signal;

mix the local carrier signal with the first samples to generate first carrier-free signal samples;

generate a local spreading code;

correlate the first carrier-free signal samples with the local spreading code to generate first complex-valued correlation results for the first epoch; and process the first complex-valued correlation results to produce at least one of: a first indication of whether the GNSS signal is detected or not; and a first GNSS measurement for the first epoch, wherein, during the mixing for the first epoch, a carrier phase of the local carrier signal is controlled to track a carrier phase of the GNSS signal using a phase locked loop, and for a second epoch:

obtain second samples of the GNSS signal, obtain at least one Doppler estimate for the GNSS signal, wherein the at least one Doppler estimate is based on inertial measurements made at the receiver, mix the local carrier signal with the second samples to generate second carrier-free signal samples;

correlate the second carrier-free signal samples with the local spreading code to generate second complex-valued correlation results for the second epoch; and process the second complex-valued correlation results to produce at least one of: a second indication of whether the GNSS signal is detected or not; and a second GNSS measurement for the second epoch, wherein, during the mixing for the second epoch, the carrier phase of the local carrier signal is controlled based at least in part on the at least one Doppler estimate.

The GNSS receiver may further comprise: an RF front-end, for receiving the GNSS signal, and for down-converting and digitising the GNSS signals; and a mixer for wiping off a residual carrier from the signals. The GNSS receiver may further comprise an intermediate-frequency (IF) processing unit, for processing the signals down-converted from RF to IF by the RF front-end. An output of the RF front-end may be coupled to an input of the intermediate-frequency processing unit. An output of the IF processing unit may be coupled to an input of the mixer.

The GNSS receiver may further comprise at least a first correlator, coupled to an output of the mixer, configured to wipe off a spreading code of the GNSS signal. The first correlator may be part of a bank of correlators, including early, prompt, and late correlators.

One or more outputs of the first correlator may be coupled to at least one tracking loop, including one or both of a code tracking loop and a carrier tracking loop.

The at least one tracking loop may comprise a code-phase feedback controller configured to estimate the code phase of the GNSS signal; the GNSS receiver may further comprise a code generator, configured to generate the local spreading code.

The code generator may comprise a numerically controlled oscillator (NCO), configured to generate a clock signal for generating the local spreading code.

The code generator may provide an input to the correlator to enable it to wipe off the spreading code of the GNSS signal.

The GNSS receiver may further comprise a carrier generator, configured to generate a local carrier signal for wiping off the residual carrier from the GNSS signal. The carrier generator may comprise an NCO configured to generate the local carrier signal.

BRIEF DESCRIPTION OF THE DRAWINGS

The invention will now be described by way of example with reference to the accompanying drawings, in which.

It should be noted that these figures are diagrammatic and not drawn to scale.

DETAILED DESCRIPTION

Reference will now be made in detail to examples according to the present disclosure, which are illustrated in the accompanying drawings. The described examples should not be construed as being limited to the descriptions given in this section; the examples may have different forms.

Figure 1:
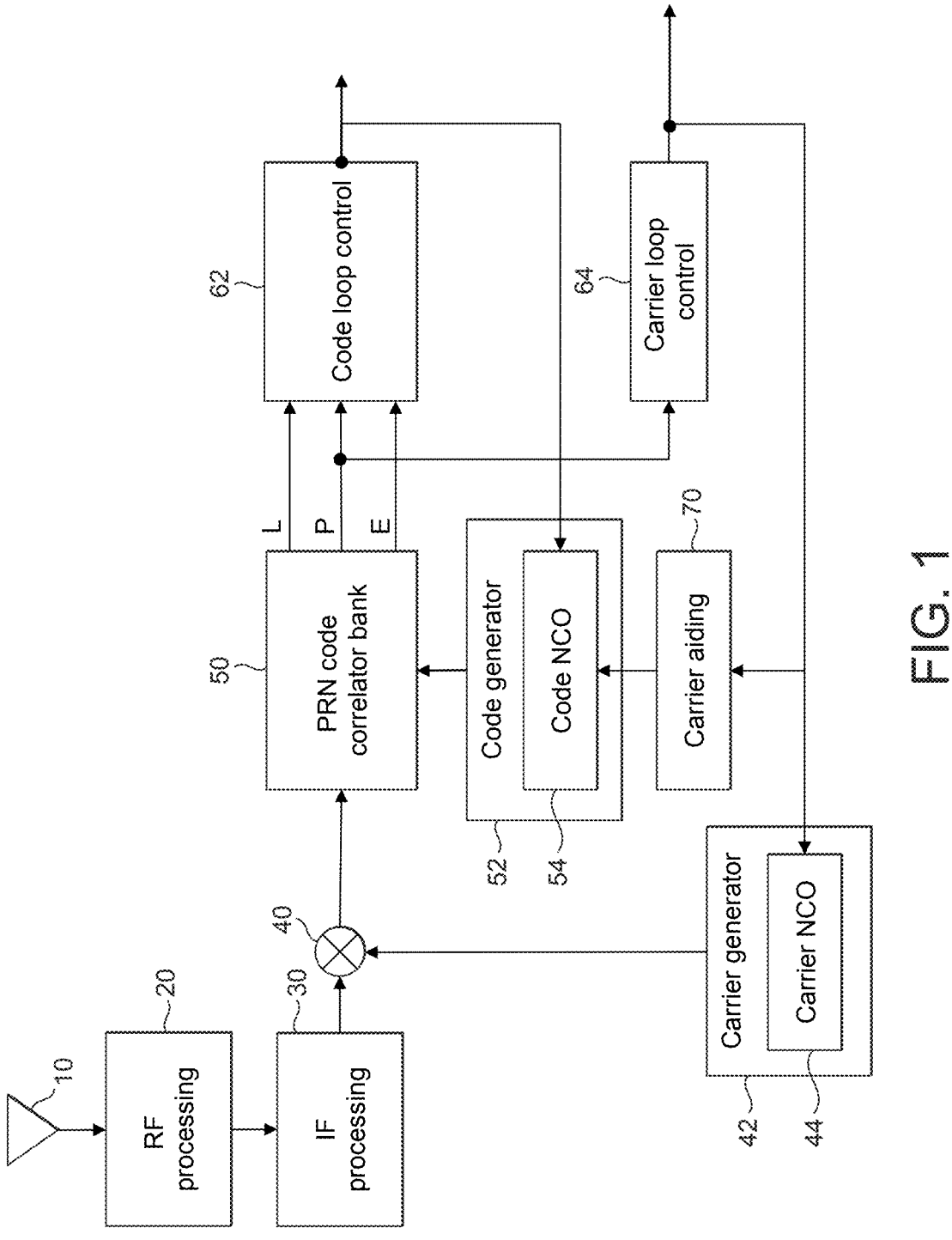
FIG. 1 is a block diagram of a GNSS receiver operating in a first mode of operation, according to an example.

FIG. 1 is a block diagram of a GNSS receiver operating in a first mode of operation, according to an example. This particular mode of operation reflects a conventional approach to signal-tracking. This conventional approach may be suitable under good signal reception conditions (for example, open sky conditions with little or no multipath).

The GNSS receiver is configured to receive satellite signals from GPS satellites. It may alternatively or additionally be configured to receive satellite signals from other constellations (for example, Galileo and BeiDou). The GNSS receiver comprises an antenna 10 for receiving satellite signals. An RF front-end 20, coupled to the antenna 10, is configured to down-convert and digitise the satellite signals received via the antenna 10. The RF front-end essentially conditions the signals for subsequent signal processing. Other typical tasks performed by the front-end include filtering, amplification and automatic gain control. The satellite signals received at the RF front-end 20 via the antenna 10 include an L1C/A signal.

The GNSS receiver further comprises an intermediate frequency (IF) processing unit 30, configured to process the satellite signals converted from radio frequency (RF) to IF in the RF front-end. The output of the IF processing unit 30 is coupled to an input of a mixer 40. The other input of the mixer 40 receives a local carrier wave, hereafter replica carrier signal, generated to replicate the carrier frequency and phase of the incoming signal. The replica carrier signal is a digital sinusoidal signal generated by a carrier generator 42. In this way the mixer 40 is configured to wipe off, i.e. remove, any residual carrier, e.g. offset caused by the Doppler effect, from the incoming signal, by mixing the incoming signal with the replica carrier signal (in other words, calculating the product of the incoming signal and the replica carrier signal). In the present example, it will be assumed that the intermediate frequency is (approximately) zero. Although the carrier of the satellite signal is already removed before the incoming signal reaches mixer 40, there will be a (small) constant remaining IF and a varying carrier offset caused by the relative motion between the satellite and GNSS receiver. The carrier generator 42 comprises a numerically controlled oscillator (NCO) 44 configured to generate the replica carrier signal.

The output of the mixer 40 is provided as input to a bank 50 of correlators comprising three correlators. Each correlator comprises a multiplier and an integrate-and-dump (I/D) unit (not shown in FIG. 1). The output of each multiplier is provided as input to the respective integrate-and-dump (I/D) unit. Each multiplier multiplies the input signal by a replica spreading code. Each I/D unit calculates the sum of the resulting product values, over a suitable dwell. The dwell defines the length of a coherent integration within the correlator and corresponds an integer number of iterations (most commonly one iteration) of a spreading code used to modulate the GNSS signal. The bank of correlators includes an "early" (E) correlator, a "prompt" (P) correlator; and a "late" (L) correlator. As their names suggest, these three correlators use differently shifted versions of the replica spreading code. The replica spreading code is a binary pseudo-random noise (PRN) signal, and is generated by a code generator 52, which operates under the control of code loop controller 62. The code loop controller 62 receives the outputs of the three I/D units. It should be understood that the use of three correlators is merely illustrative. In many examples, there may be more than three correlators. In particular, there may be multiple "early" correlators, each with a different delay (shift) of the replica spreading code. Likewise, there may be multiple "late" correlators, each with a different delay (shift) of the replica spreading code. According to one implementation there are four "early" correlators and four "late" correlators, in addition to one prompt correlator—that is, nine correlators in total.

Depending on which of the correlators (E, P, L) has the maximum output value for the current dwell, the controller 62 determines whether to adjust (for example, increment or decrement) the code phase delay control signal, which it provides to the code generator 52.

The code generator 52 is a signal code generator for the relevant GNSS signal. It comprises an NCO 54, which is configured to generate a clock signal for generating the replica spreading code for the GNSS signal. The NCO is controlled partly by the code phase delay control signal from the code loop controller 62 and partly based on frequency estimates generated by a carrier loop controller 64.

In this way, the bank of correlators, together with the code loop controller 62, carrier loop controller 64, and the code generator 52, function as a code phase tracking loop—in other words, a delay locked loop (DLL)—for the GNSS signal. The code phase tracking loop ensures that the code phase of the replica spreading code used by the "P" correlator tracks the actual code phase of the received other L1 signal with as little delay as possible.

The outputs of the I/D units within the bank 50 of correlators consist of complex-valued samples, also referred to as in-phase and quadrature samples (I/Q samples). In particular, the output of the I/D unit for the prompt (P) correlator represents I/Q samples of the GNSS signal. When implemented in hardware, each correlator (as with other hardware blocks), will include separate I- and Q-branches. That is, there will be a multiplier and an I/D unit for the in-phase (I) samples, and another multiplier and I/D unit for the quadrature-phase (Q) samples. Nevertheless, for simplicity, it is more convenient to conceptualise these as a single multiplier and a single I/D unit, having complex outputs, and that is how they will be described here.

The I/Q samples from the prompt ("P") correlator output are provided to the carrier loop controller 64. The carrier loop controller 64 estimates the carrier frequency and carrier phase of the GNSS signal. It outputs the estimate as a carrier control signal, which is fed back to control the NCO 44 of the carrier generator 42. In providing this feedback, the carrier loop controller 64 implements a carrier tracking loop for the GNSS signal, ensuring that the frequency (and phase) of the replica carrier signal (generated by the carrier generator 42) tracks the actual frequency (and phase) of the carrier of the received L1 signal as closely as possible. This enables the GNSS receiver to take account of Doppler shift, due to the relative motion between the receiver and satellite. By controlling the frequency of the NCO in the carrier generator 42, both the frequency and phase of the replica carrier signal are controlled to match the frequency and phase of the residual carrier. (The phase of the replica carrier signal is advanced by increasing the frequency; the phase is retarded by decreasing the frequency.) Effectively, this implements a phase locked loop (PLL), tracking the residual carrier frequency and phase.

In the present implementation, the code loop controller 62 and the carrier loop controller 64 produce updates at the same rate—for example, 50 Hz. That is, they both operate on the same control period—in this example, 20 ms.

As well as updating the NCO 54 of the code generator 52 based on the code phase measurements produced by the code loop controller 62, it may be advantageous to update the chipping rate (and thereby code phase) of the NCO 54 based on the output of the carrier loop controller 64. Carrier aiding block 70 converts the output of the carrier loop controller 64 (which is effectively an estimate of Doppler frequency) into a chipping rate control value for the code NCO 54. The code NCO 54 runs at the specified chipping rate over the course of the control period (e.g., 20 ms). The chipping rate thereby influences the evolution of the code phase of the replica spreading code. The chipping rate control value is a down-scaled value from the Doppler estimate, based on the constant ratio of nominal carrier frequency to nominal chipping rate. If the code loop controller 62 detects a change/error in the code phase, it updates the code phase delay control signal accordingly, in the next control period. This control of the code phase is added to the cumulative effect of the chipping rate control.

Note that, in contrast to the carrier NCO 44, the code NCO 54 has two inputs—one for chipping rate control (from carrier aiding block 70, based on the Doppler estimate from the carrier loop controller 64) and one for code phase control (from the code loop controller 62). They are controlled independently. The chipping rate control determines the chipping rate. The code phase control determines the initial code phase of the control period. As a result, unlike the PLL described previously, above (for tracking the carrier frequency and phase), the code phase is not necessarily continuous at the boundary between control periods.

The components described above enable the GNSS receiver to track the GNSS signal in frequency and phase of the carrier as well as code phase. The code tracking loop and the carrier loop form a "measurement engine" that includes blocks 40-70.

In tracking mode, the output of the code loop controller 62 provides a real-time code phase measurement. Likewise, the output of the carrier loop controller 64 provides a real-time Doppler measurement. This code phase measurement and Doppler measurement are provided to a positioning engine (not shown in FIG. 1) which combines them with GNSS measurements from other GNSS signals to calculate a navigation solution (including a position fix). In acquisition mode, the code loop controller 62 can detect whether a GNSS signal has been acquired successfully, or whether the tracking loop is in effect tracking noise. This can be done by comparing the correlation results on the early, late, and prompt taps. When a GNSS signal is present, the magnitude of the correlation output on the prompt tap is significantly greater than the respective magnitudes on the early and late taps.

Demodulation/bit-detection is not illustrated in the simplified block diagram of FIG. 1. However, it should be understood that this is typically also performed, in practice, when receiving GNSS signals. When tracking a pilot sequence, there is no need for bit detection. When tracking the remainder of the GNSS signal, bit detection can be performed by examining phase changes from symbol to symbol on the prompt correlator output.

According to one aspect of the present disclosure, the tracking scheme of FIG. 1 is used when the GNSS receiver determines that signal reception conditions are good (at least for the GNSS signal in question). For example, the GNSS receiver may determine that $C/N_0$ is greater than 37 dB-Hz, or that carrier phase lock is intact, or that the residual is below a predetermined threshold (or may determine that a combination of two or more of these criteria are met). Note that this decision can be made independently for each GNSS signal that is being tracked by the receiver. (FIG. 1 illustrates the tracking method for one GNSS signal, but it should be understood that the receiver will typically track several GNSS signals simultaneously, in order to produce a navigation solution.)

Figure 2:
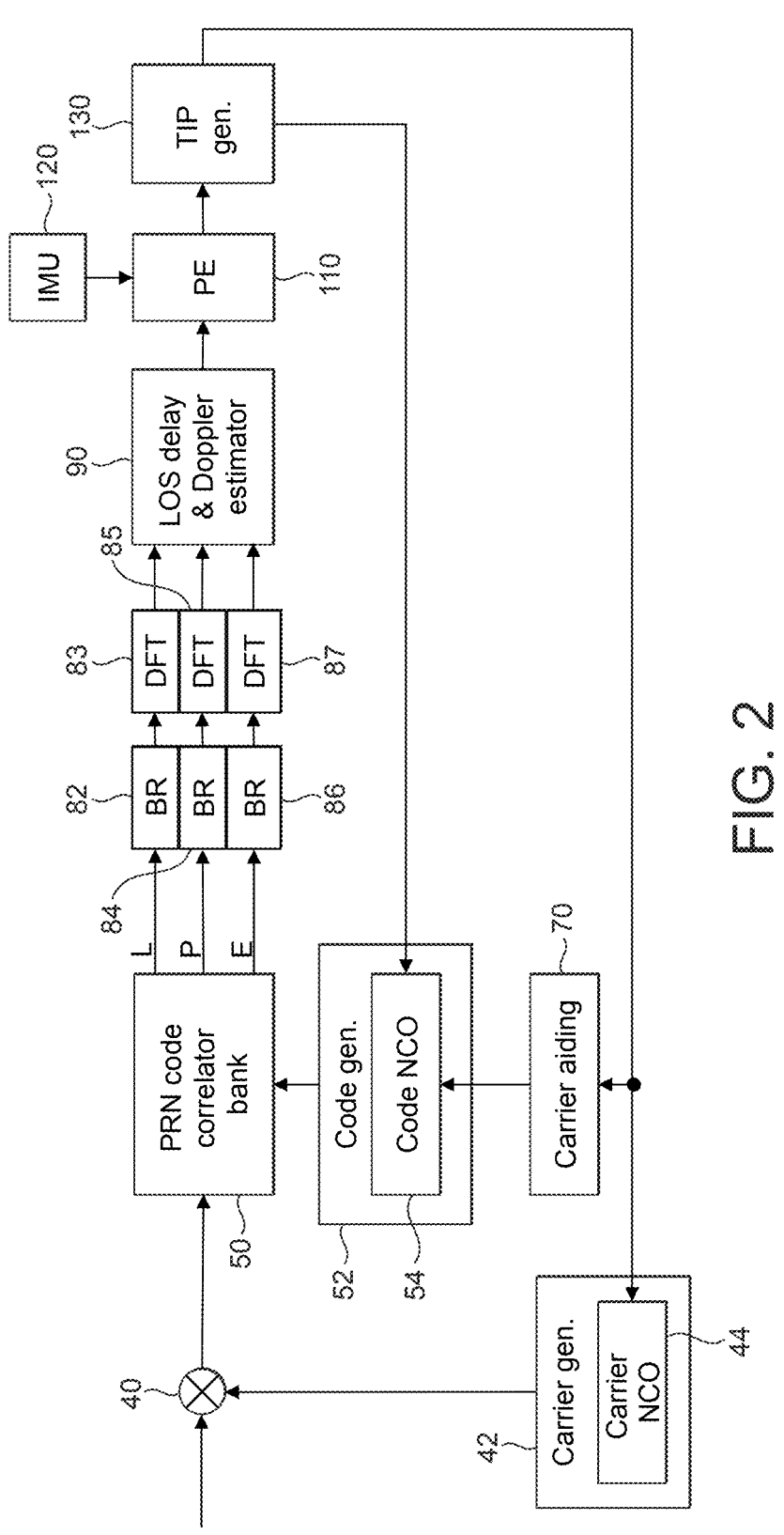
FIG. 2 is a block diagram of a GNSS receiver operating in a second mode of operation, according to an example.

FIG. 2 is a block diagram of a GNSS receiver operating in a second mode of operation, according to an example. The antenna 10, RF front-end 20, and IF processing unit 30 are omitted, for simplicity. They are the same as in the example of FIG. 1. The mixer 40, bank 50 of correlators, carrier generator 42, code generator 52, and carrier aiding block 70 operate in the same way as in FIG. 1 and will not be further described for this reason.

The operation mode illustrated in FIG. 2 differs from that illustrated in FIG. 1 by the way in which the carrier and chipping code of the GNSS signal are tracked. In the operation mode illustrated in FIG. 2, there is no feedback loop within the measurement engine itself. Instead, feedback to control the carrier NCO 44 and the code NCO 54 is provided from a positioning engine (PE) 110, which is responsible for calculating the navigation solution.

For the operation mode shown in FIG. 2, the outputs of the late, prompt, and early taps of the bank 50 of correlators are provided as inputs to respective bit removal (BR) blocks 82, 84, and 86. When receiving a part of the GNSS signal that contains data (for example, a navigation message), the bit removal blocks 82, 84, 86 wipe off the detected data bit by multiplying the complex correlator output by 1 or −1, as appropriate. When receiving a part of the GNSS signal that contains a pilot sequence, there is no need for bit detection, since the bit sequence of the pilot signal is known in advance.

The output of each bit removal block 82, 84, 86 is provided as input to a respective discrete Fourier transform (DFT) block 83, 85, 87. Each DFT block calculates a Fourier transform of the complex correlator outputs, over a defined coherent integration interval. The outputs of the DFT blocks 83, 85, 87 are provided as input to a line-of-sight (LoS) delay and Doppler estimator 90. The estimator 90 uses the information from the Fourier transforms to estimate a carrier phase and code phase of the GNSS signal.

The collective output of the DFT blocks 83, 85, 87 forms a two-dimensional matrix spanning a range of frequencies and a range of code-phase delays. In time variant channels, each multipath component typically possesses a Doppler and delay value that are different to the LoS values. In this delay-frequency matrix, a correlation triangle shows up at a specific Doppler value, with the peak of the triangle indicating the vicinity of delay and Doppler of a multipath component. By inspecting the matrix, several such peaks in the delay-frequency grid can be identified. The peak with the shortest time-of-arrival is detected as the line-of-sight path. When this is done, the taps on both sides of the correlation triangle are interpolated to give an estimate of the delay.

When the GNSS signal is being tracked accurately (and in the absence of fast dynamics) the LoS component should remain aligned with the "prompt" tap, with a Doppler frequency of zero. Any deviation of the code phase of the local spreading code from the code phase of the received GNSS signal will cause either the early or the late correlator tap to show an output with a greater magnitude than the prompt tap. Meanwhile, any deviation of the carrier frequency of the local carrier signal from the carrier frequency of the received GNSS signal will show up in the Fourier transform as a peak at a nonzero frequency.

The output of the estimator 90 corresponds to the output of the code loop controller 62 and the carrier loop controller 64 of FIG. 1. However, in the mode of operation illustrated in FIG. 2, the output of the estimator is not used directly to control the carrier generator 42 or the code generator 52. Instead, the output of the estimator 90 is provided as one of a number of inputs to the positioning engine 110. The positioning engine 110 also receives input from an inertial measurement unit (IMU) 120. One output of the positioning engine is a navigation solution, including estimates of position, velocity, time (PVT), and other state variables. The navigation solution is produced once per epoch and is passed to a "Tracking Intelligence Provider" (TIP) generator 130. The positioning engine 110 also outputs more frequent estimates of Doppler frequency, based on the inertial measurements that have been received since the most recent navigation solution. These Doppler frequency estimates are also output to the TIP generator. By way of example, the interval between epochs may be 1 s; therefore, the navigation solution may be output at a frequency of 1 Hz. The interval between Doppler estimates may be 20 ms; thus, the Doppler estimates may be output at a frequency of 50 Hz.

The TIP generator 130 converts the outputs of the positioning engine 110 into a code phase delay control signal for the code generator 52 and a carrier control signal for the carrier generator 42. To do this, the TIP generator 130 compares the current satellite positions with the current PVT solution from the positioning engine 110. From this com- parison, the TIP generator predicts the delay and Doppler along the line-of-sight vector from the receiver to each of the satellites.

The code phase delay control signal is updated at the lower rate (for example, 1 Hz). This is because the code phase estimates are produced as part of the navigation solution once per epoch. The carrier control signal is updated at the higher rate, based on the more frequent Doppler estimates. Note that, although the code phase delay control signal is only updated at the lower rate (e.g., 1 Hz), the code phase of the code generator 52 is updated at the higher rate (e.g., 50 Hz). This is because the carrier aiding unit 70 updates the code generator 52 continually in the interval between epochs, at the higher rate, based on the higher rate Doppler estimates. In this way, the high-rate Doppler estimates can help to compensate for acceleration and high-order dynamics of the receiver during the coherent integration by the correlator bank and DFT blocks. Note, however, that the code phase of the code NCO is re- initialised at the start of each epoch based exclusively on the code phase delay control signal. In other words, the evolu- tion of the code phase over the preceding epoch due to the cumulative influence of the carrier aiding block 70 does not affect the setting of the code phase at the start of the next epoch.

The measurement engine in FIG. 2 comprises blocks 40-90 (but not blocks 110, 120, 130). The output of the measurement engine is the output of the estimator 90. The positioning engine 110 receives corresponding inputs from multiple measurement engines—one for each GNSS signal that is being tracked. Typically, at least four signals from different satellites will be tracked, in order to support the calculation of the navigation solution. The positioning engine 110 combines the information provided by the GNSS measurements from the various measurement engines with the information provided by inertial measurements from the IMU 120. To do this, the positioning engine 110 uses a Kalman filter or other state estimator. The output of the state estimator includes the position, velocity, and time (PVT) solution. As mentioned above, the TIP generator 130 pre- dicts the Doppler frequency and code phase for each GNSS signal based on the PVT solution and corresponding satellite LoS vectors. Note that, in some embodiments, the function- ality of the TIP generator 130 may be merged into the positioning engine 110. For example, the positioning engine 110 may output state estimates for Doppler frequency and code phase for each satellite.

The mode of operation illustrated in FIG. 2 may be particularly suitable in difficult signal reception conditions. Completing the tracking loops through the positioning engine 110, helps to make the feedback to the code generator 52 and carrier generator 42 as robust and stable as possible. In situations where the tracking lock on one weak GNSS signal might otherwise be lost by the respective measure- ment engine, if it were working in isolation, the information provided by the other measurement engines (and the IMU 120) can enable continued tracking of the weak GNSS signal.

At the same time, because the tracking can keep a lock on the GNSS signal even in challenging signal reception con- ditions (and even in cases of fast dynamics, thanks to the use of the inertial measurements), the coherent integration time of the bank 50 of correlators and the subsequent DFT blocks 83, 85, 87 can be increased. This in turn increases the sensitivity of the measurement engine, enabling it to acquire and track weaker signals. In one example according to the present disclosure, the coherent integration time of the DFT blocks is 1 s.

A sequence of operations performed for each epoch will now be described in greater detail. Once per epoch, the positioning engine 110 provides code phase and Doppler input from the navigation solution. This is used to set the NCOs 44 and 54. The bank 50 of correlators begins producing millisecond samples. The positioning engine 110 provides high-rate Doppler input many times per epoch (for example 50 times per epoch, in the present example). Each time fresh Doppler input is provided, the NCOs 44 and 54 are set based on it. (The code NCO 54 is set via the carrier aiding unit 70; the carrier NCO is set directly.) The bank 50 of correlators continues producing millisecond samples. These are input to the DFT blocks 83, 85, 87 to calculate the DFT. After the Fourier Transforms are produced by the DFT blocks 83, 85, 87, they are evaluated by the estimator 90.

Optionally, the millisecond samples can be pre-integrated as soon as they are available, in order to begin calculating the DFT in a pipelined fashion. Alternatively, the millisecond samples can be stored until enough samples are available for a complete coherent integration period (e.g., 1 s) and the DFT can then be calculated using the complete set of samples.

Figure 3:
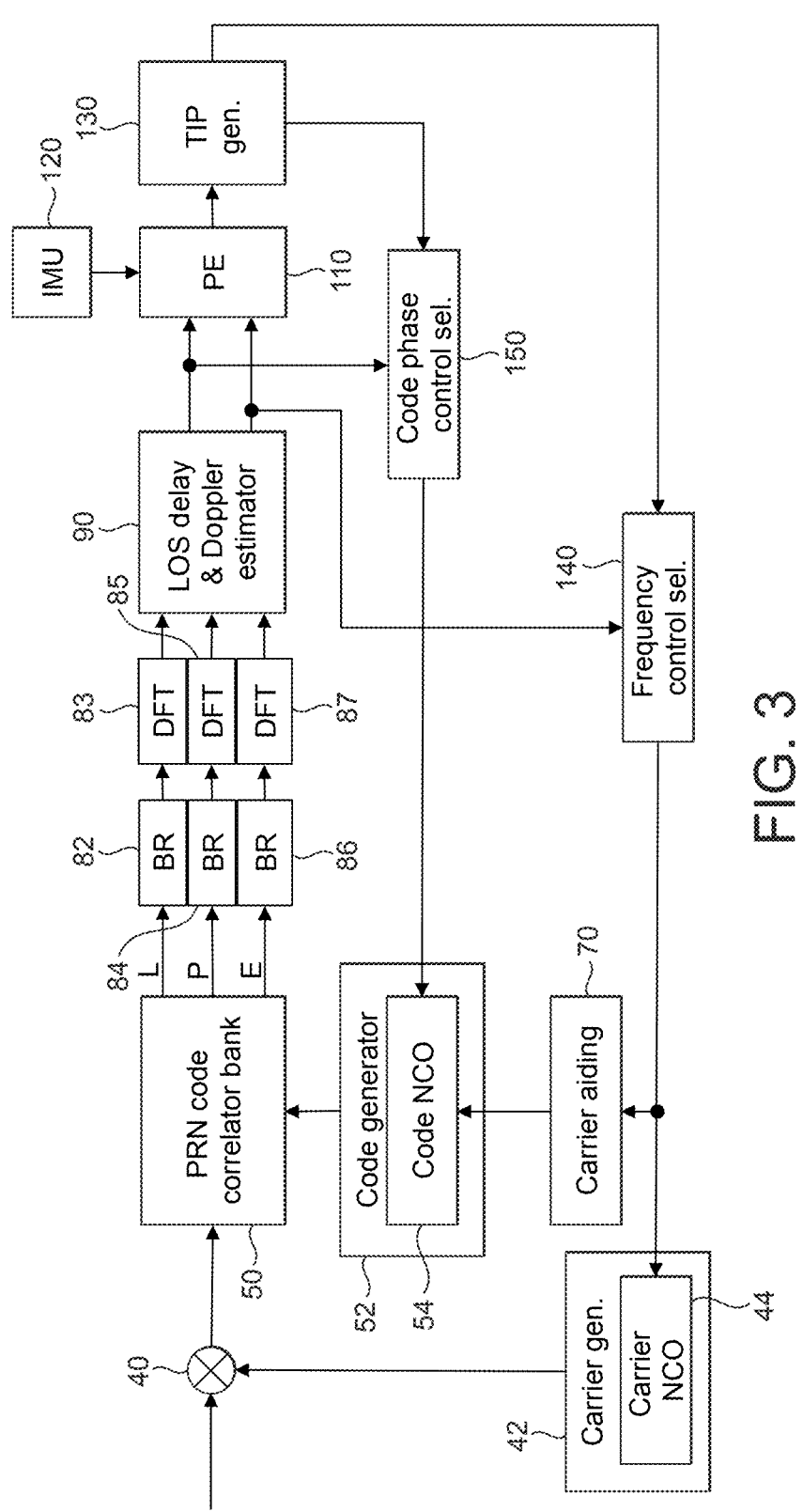
FIG. 3 is a block diagram of a GNSS receiver operating in a third mode of operation, according to an example.

FIG. 3 is a block diagram of a GNSS receiver operating in a third mode of operation, according to an example. The third mode of operation is essentially a hybrid of the first two modes. It is most easily understood by comparing FIG. 3 with FIG. 2. As with FIG. 2, the antenna, RF front-end and IF processing unit are omitted for simplicity. The operation mode of FIG. 3 relies on all the same components as FIG. 2, operating in the same way. This includes the mixer 40, bank 50 of correlators, carrier generator 42, code generator 52, carrier aiding block 70, bit removal blocks 82, 84, 86, DFT blocks 83, 85, 87, estimator 90, positioning engine 110, IMU 120, and TIP generator 130. However, the mode of operation of FIG. 3 relies on two additional components— namely a frequency control selector 140 and a code phase control selector 150.

The frequency control selector 140 receives two inputs. One input is coupled to an output of the LoS delay and Doppler estimator 90. This provides the frequency control selector 140 with the Doppler estimate produced by the measurement engine (that is, by the estimator 90). A second input is coupled to an output of the TIP generator 130. This provides the frequency control selector 140 with the Doppler estimate produced from the output of the positioning engine 110 (based in part on inertial measurements from the IMU 120). For each epoch—that is, for each coherent integration by the DFT blocks 83, 85, 87—the frequency control selector 140 selects one of the two Doppler estimates to control the carrier generator 42 (and the code generator 52, via the carrier aiding block 70). When the frequency control selector 140 selects the Doppler estimate produced by the estimator 90, the frequency control is achieved in a manner similar to that of FIG. 1, with closed-loop control. When the frequency control selector 140 selects the Doppler estimate produced by the TIP generator 130, the frequency control is achieved in a manner similar to that of FIG. 2.

The code phase control selector 150 functions in a similar way. It receives two inputs. One input is coupled to an output of the LoS delay and Doppler estimator 90. This provides the code phase control selector 150 with the code phase estimate produced by the measurement engine (that is, by the estimator 90). A second input is coupled to an output of the TIP generator 130. This provides the code phase control selector

150 with the code phase estimate produced from the output of the positioning engine 110 (based in part on inertial measurements from the IMU 120). For each epoch—that is, for each coherent integration by the DFT blocks 83, 85, 87—the code phase control selector 150 selects one of the two code phase estimates to control the code generator 52. When the code phase control selector 150 selects the code phase estimate produced by the estimator 90, the code phase control is achieved in a manner similar to that of FIG. 1, with closed-loop control. When the code phase control selector 150 selects the code phase estimate produced by the TIP generator 130, the code phase control is achieved in a manner similar to that of FIG. 2.

Both the estimator 90 and the TIP generator 130 produce code phase estimates the lower rate (for example, 1 Hz). They both produce Doppler estimates at the higher rate (for example, 50 Hz). The frequency control selector 140 and the code phase control selector 150 can select between their inputs independently. This makes the operation mode of FIG. 3 as flexible and adaptable as possible. In this context, the operation mode of FIG. 2 can also be seen as a simplified version of that of FIG. 3.

The selections of which estimates are used to drive the NCOs 44 and 54 be made in a variety of ways. According to the present example, the selection is made based on an examination of the consistency between the pairs of estimates.

The frequency control selector 140 compares the Doppler estimate produced by the estimator 90 with that produced by the TIP generator 130. If the two estimates are in agreement (that is, if an absolute difference between them is less than a predetermined threshold) then the frequency control selector 140 selects the Doppler estimate produced by the estimator 90 for the current epoch. Otherwise, the frequency control selector 140 selects the Doppler estimate produced by the TIP generator 130.

The code phase control selector 150 compares the code phase estimate produced by the estimator 90 with that produced by the TIP generator 130. If the two estimates are in agreement (that is, if an absolute difference between them is less than a predetermined threshold) then the code phase control selector 150 selects the code phase estimate produced by the estimator 90 for the current epoch. Otherwise, the code phase control selector 150 selects the code phase estimate produced by the TIP generator 130.

Without wishing to be bound by theory, it is believed that the Doppler and code phase estimates produced by the measurement engine (that is, by the estimator 90) will usually be more accurate than those produced by the TIP generator 130, provided signal reception conditions are good. When signal reception conditions are bad, the measurement engine may begin to lose its lock on the GNSS signal, and one or both estimates produced by the measurement engine may therefore drift away from those produced by the TIP generator 130. By detecting this, according to the operation mode of FIG. 3, the system can switch to the more reliable estimate(s) produced by the TIP generator 130.

According to various aspects of the present disclosure, the operation modes of FIGS. 1-3 can be used in various configurations. For instance, a GNSS receiver may use exclusively the operation mode of FIG. 2, or exclusively the operation mode of FIG. 3. According to some examples, a GNSS receiver may be configured to implement more than one operation mode. For instance, a GNSS receiver may be configured to implement the operation mode of FIG. 1 and the operation mode of FIG. 2 and select between them in different circumstances. Alternatively, a GNSS receiver may be configured to implement the operation mode of FIG. 1 and the operation mode of FIG. 3 and select between them in different circumstances.

Figure 4:
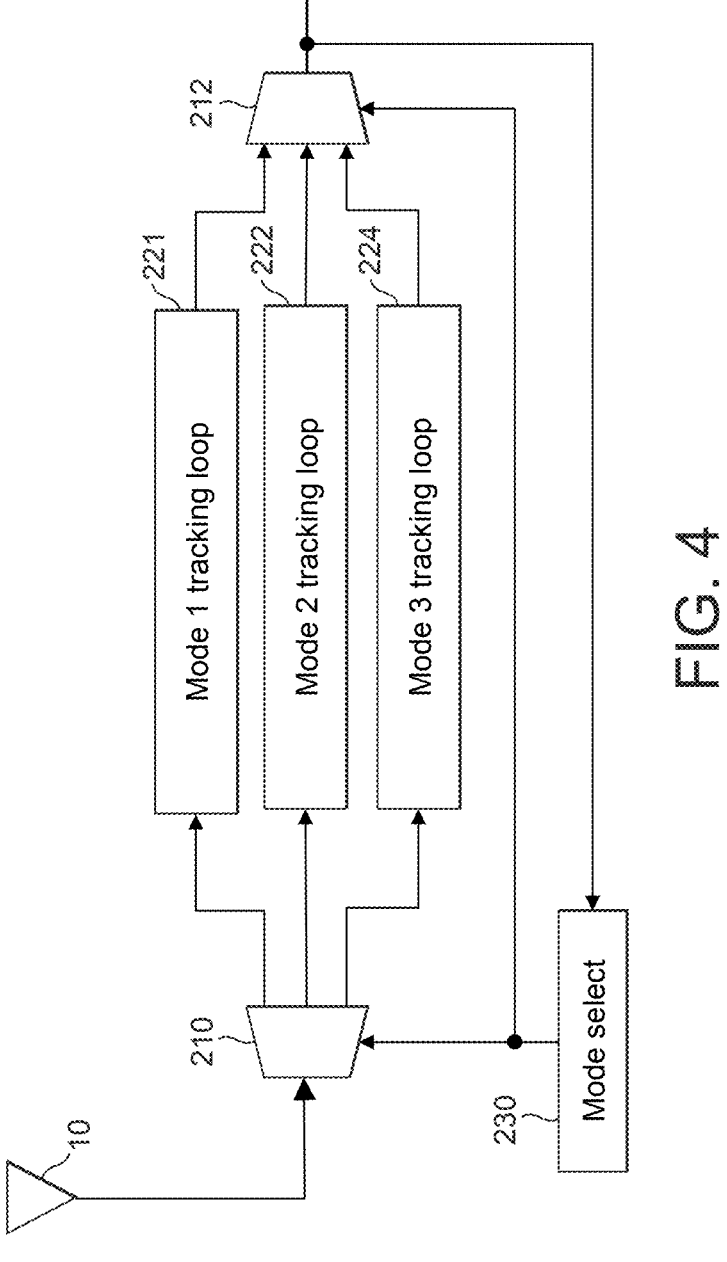
FIG. 4 is a high-level block diagram of a GNSS receiver operating with mixed modes of operation, according to an example.

In some examples, a GNSS receiver may be configured to implement all three operation modes and select between them. FIG. 4 is a high-level block diagram of a GNSS receiver operating with mixed modes of operation, according to such an example. In FIG. 4, the antenna 10 is shown. However, for simplicity, the RF front-end 20 and the IF processing unit 30 are not shown. The IF samples from the IF processing unit are input to a demultiplexer 210. Based on a mode selection signal generated by mode selector 230, the demultiplexer 210 directs the samples to one of three tracking loops. The Mode 1 tracking loop 221 implements the operation mode of FIG. 1; the Mode 2 tracking loop 222 implements the operation mode of FIG. 2; and the Mode 3 tracking loop implements the operation mode of FIG. 3. The outputs of the three tracking loops 221, 222, 224 are provided to a multiplexer 212, which selects between them. Like the demultiplexer 210, the multiplexer 212 is under the control of the mode selector 230. The output of the multiplexer 212 is the GNSS measurement produced by the respective selected tracking loop. (In this example, the positioning engine is considered as a separate component, not shown in FIG. 4—the GNSS measurements are provided to the positioning engine to derive the navigation solution.)

The mode selector 230 selects the mode based on an indication of signal quality. In one example, if $C/N_0$ is greater than 37 dB-Hz, or if carrier phase lock is intact, or if the residual is below a predetermined threshold, the signal reception conditions may be categorized as being of good quality for that GNSS signal. In this case Mode 1 may be selected for that signal. Mode 3 may be selected if the signal is of poor quality (that is, not good quality). Mode 2 may be selected if the signal is of poor quality, but the receiver is trying to conserve power (since Mode 2 can be considered a simplified version of Mode 3). It should be understood that the mode selection can be made independently for each GNSS signal being tracked by the receiver. For instance, for a given epoch, Mode 1 may be selected for one or more GNSS signals, and Mode 2 (or Mode 3) may be selected for one or more other GNSS signals.

An optional refinement may be applied, when obtaining Doppler estimates from the TIP generator (based on the output of the positioning engine 110), in the modes of operation of FIGS. 2 and 3. Although the TIP generator 130 supplies a Doppler estimate at the higher rate (e.g., 50 Hz), which is the same rate as the estimator 90, there is additional latency in the Doppler estimates produced by the TIP generator 130. One way to help compensate for this is to extrapolate, from the most recent estimates of Doppler frequency, what the Doppler frequency is expected to be at the time of the next update to the carrier NCO 44 and code NCO 54.

Figure 5:
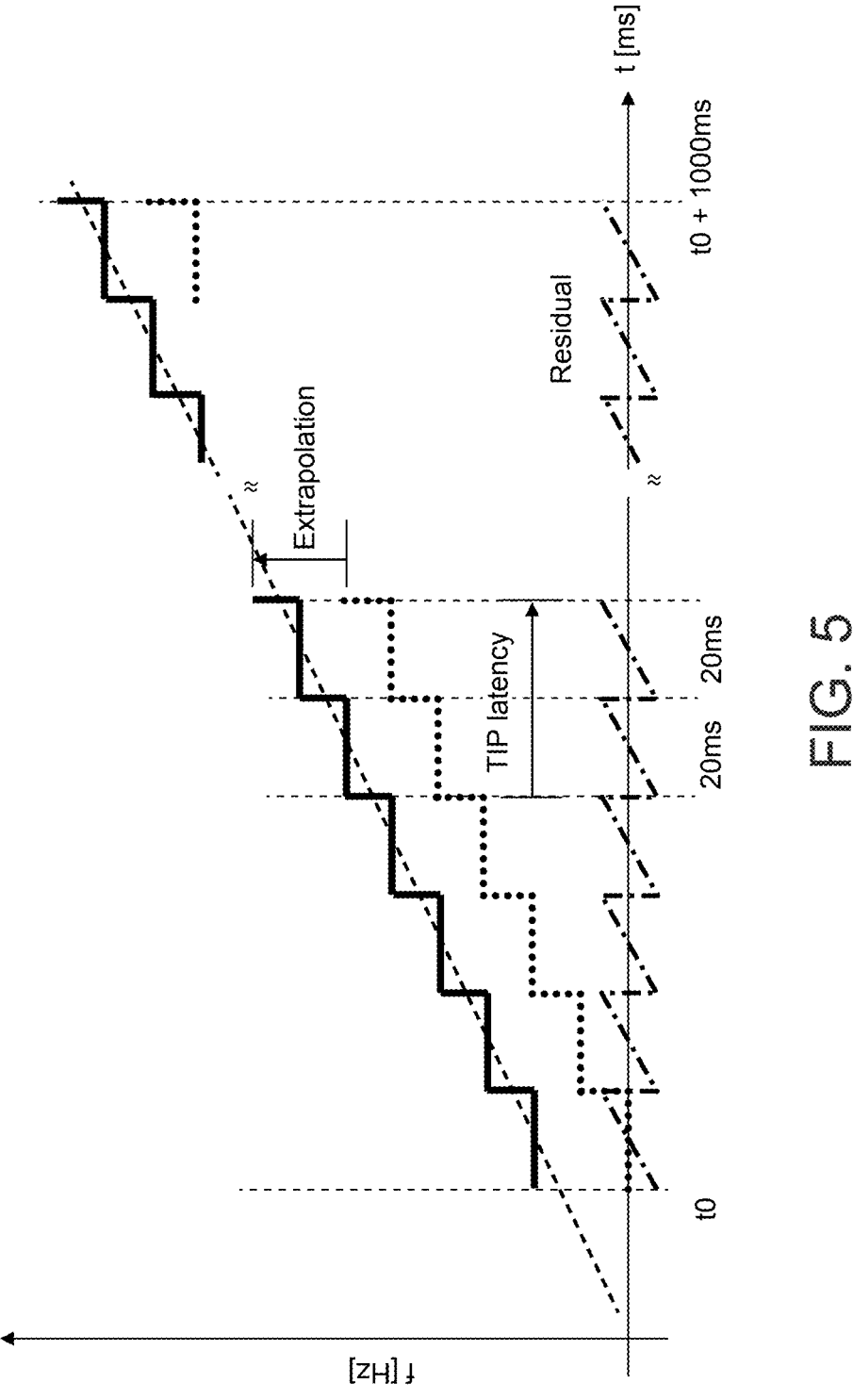
FIG. 5 is a graph illustrating Doppler frequency extrapolation according to an example.

According to the present implementation, Doppler estimates are extrapolated assuming constant acceleration. This assumes a linear relationship between Doppler frequency and time. The instantaneous acceleration (or rate of change of the Doppler frequency) is estimated by comparing the two most recently available Doppler estimates. The TIP generator 130 then extrapolates from the most recent Doppler estimate using the acceleration estimate, to predict the Doppler frequency at the moment the NCOs 44, 54 are next set. This is illustrated in FIG. 5, for a 50 Hz update rate of the NCOs, and an assumed latency of 40 ms. The plots in FIG. 5 represent an interval equal to the coherent integration time of the DFTs (in this example, 1 s).

The dashed line represents the assumed linear function of Doppler frequency with respect to time. In the example illustrated, the frequency is increasing over time. This corresponds to a situation where the GNSS receiver is accelerating towards the satellite. The Doppler frequency is approximated by a piecewise constant function, since the Doppler is estimated, and the NCOs are updated every 20 ms. Due to the latency in the system (40 ms, equal to two of the piecewise constant intervals) the Doppler estimates (dotted line) always lag behind the true Doppler frequency (dashed line). When the frequency is increasing, this means that the Doppler estimates lag below the true Doppler. This is shown in FIG. 5—the lower staircase function (dotted line) represents the Doppler estimates with 40 ms latency. To compensate for this latency, the TIP generator extrapolates upwards, to take account of the (expected) further increase in Doppler frequency over the latent period. The extrapolation assumes that the Doppler frequency will continue to exhibit the same rate of change with respect to time. The extrapolated Doppler estimates are represented by the upper staircase function (solid black line), which better approximates the true (linearly increasing) Doppler frequency. The triangular function (shown in dash-dot) around 0 Hz is the residual Doppler frequency, seen in the complex correlator outputs.

In the current implementation of the GNSS receiver, the blocks 20, 30, 40, 42, 44, 50, 52, and 54 are implemented in dedicated hardware. Blocks 62, 64, 70, 82-87, 90, 110, 120, 130, 140, and 150 are currently implemented in software running on a processor of the GNSS receiver. However, they could alternatively be implemented in dedicated hardware.

It should be understood that the scope of the present disclosure is not limited to the examples described above. Many variations will be apparent to those skilled in the art, based on the foregoing description.

The 20 ms dwells/integration periods for coherent integration described above may be beneficial; however, the method is not limited in this respect. Longer or shorter integration periods may be chosen. The choice may be based on the signal conditions expected or experienced in use. For example, in highly dynamic scenarios, where the receiver is subject to frequent rapid changes in speed and/or direction, a shorter coherent integration period may be desirable, to better cope with the signal dynamics. Conversely, if the receiver is expected to be static, it might be beneficial to extend the coherent integration period—for example, so as to integrate over multiple bit-periods of the GNSS signal.

In the examples above, the measurement engine was described as producing GNSS measurements from the GNSS signal. This is indeed the typical primary purpose of a measurement engine. However, the measurement engine could also (or instead) produce an indication of whether or not the GNSS signal is detected—that is whether a GNSS signal has been acquired, prior to tracking it and/or making GNSS measurements. This may be useful in particular if GNSS signal lock is lost during tracking of a GNSS signal.

Other variations involve the way in which the blocks are implemented. In the example discussed above, certain components were defined in software or software modules running on a processor of the GNSS receiver. However, in other examples, some or all of these units may be implemented in dedicated, fixed-function hardware. Likewise, components that were defined in hardware, according to the examples above, may be defined in software, in other embodiments.

In the claims, any reference signs placed between parentheses shall not be construed as limiting the claim. The word "comprising" does not exclude the presence of elements or steps other than those listed in a claim. However, where the word "comprising" is used, this also discloses as a special case the possibility that the elements or steps listed are exhaustive—that is, the apparatus or method may consist solely of those elements or steps. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method of processing a Global Navigation Satellite System (GNSS) signal received at a receiver, comprising:
    for a first epoch:
        obtaining first samples of the GNSS signal;
        generating a local carrier signal;
        mixing the local carrier signal with the first samples to generate first carrier-free signal samples;
        generating a local spreading code;
        correlating the first carrier-free signal samples with the local spreading code to generate first complex-valued correlation results for the first epoch; and
        processing the first complex-valued correlation results to produce at least one of: a first indication of whether the GNSS signal is detected or not; and a first GNSS measurement for the first epoch,
    wherein, during the mixing for the first epoch, a carrier phase of the local carrier signal is controlled to track a carrier phase of the GNSS signal using a phase locked loop, and
    for a second epoch:
        obtaining second samples of the GNSS signal,
        obtaining at least one Doppler estimate for the GNSS signal, wherein the at least one Doppler estimate is based on inertial measurements made at the receiver,
        mixing the local carrier signal with the second samples to generate second carrier-free signal samples;
        correlating the second carrier-free signal samples with the local spreading code to generate second complex-valued correlation results for the second epoch; and
        processing the second complex-valued correlation results to produce at least one of: a second indication of whether the GNSS signal is detected or not; and a second GNSS measurement for the second epoch,
    wherein, during the mixing for the second epoch, the carrier phase of the local carrier signal is controlled based at least in part on the at least one Doppler estimate.

2. The method of claim 1, wherein:
    processing the first complex-valued correlation results comprises coherently integrating them over a first coherent integration interval, and
    processing the second complex-valued correlation results comprises coherently integrating them over a second coherent integration interval,
    wherein the second coherent integration interval is longer than the first coherent integration interval.

3. The method of claim 1, wherein the at least one Doppler estimate comprises a plurality of Doppler estimates provided at intervals that are shorter than the interval between successive epochs.

4. The method of claim 3, wherein the plurality of Doppler estimates comprises:
    a first Doppler estimate, based on an earlier epoch, preceding the second epoch; and
    a plurality of second Doppler estimates, based on inertial measurements for the second epoch.

5. The method of claim 4, wherein the first Doppler estimate is derived from a navigation solution for the earlier epoch.

6. The method of claim 4, wherein the first Doppler estimate is derived from a previous epoch using a phase locked loop.

7. The method of claim 1, wherein during the correlating for the first epoch, a code phase of the local spreading code is controlled to track a code phase of the GNSS signal using a delay locked loop.

8. The method of claim 1, wherein during the correlating for the second epoch, a code phase of the local spreading code is controlled based at least in part on the at least one Doppler estimate.

9. The method of claim 1, wherein a code phase of the local spreading code is initialized for the second epoch based on a navigation solution for an earlier epoch, preceding the second epoch.

10. The method of claim 1, wherein the receiver has a first mode of operation and a second mode of operation, wherein the first mode is active for the first epoch and the second mode is active for the second epoch, wherein the first mode is selected responsive to detecting good quality signal reception conditions and the second mode is selected responsive to detecting poor quality signal reception conditions.

11. The method of claim 1, comprising, for the second epoch, comparing a first carrier phase estimate produced by a phase locked loop with a second carrier phase estimate derived from the at least one Doppler estimate; responsive to determining that a difference between the first carrier phase estimate and the second carrier phase estimate is not greater than a threshold phase difference, initializing the carrier phase of the local carrier signal for the second epoch based on the first carrier phase estimate; and responsive to determining that the difference is greater than the threshold phase difference, initializing the carrier phase of the local carrier signal for the second epoch based on the second carrier phase estimate.

12. The method of claim 1, comprising, for the second epoch, comparing a first code phase estimate produced by a delay locked loop with a second code phase estimate derived from the at least one Doppler estimate; responsive to determining that a difference between the first code phase estimate and the second code phase estimate is not greater than a threshold delay difference, initializing the code phase of the local spreading code for the second epoch based on the first code phase estimate; and responsive to determining that the difference is greater than the threshold delay difference, initializing the code phase of the local spreading code for the second epoch based on the second code phase estimate.

13. The method of claim 1, wherein
during the mixing for the second epoch, the carrier phase of the local carrier signal is controlled based at least in part on the at least one Doppler estimate, and
during the correlating for the second epoch, a code phase of the local spreading code is controlled based at least in part on the at least one Doppler estimate,
the method further comprising, for a third epoch:
obtaining third samples of the GNSS signal;
obtaining at least one Doppler estimate for the GNSS signal, wherein the at least one Doppler estimate is based on inertial measurements made at the receiver;
obtaining a carrier phase estimate based on the at least one Doppler estimate;
obtaining a code phase estimate based on the at least one Doppler estimate;

selecting between the carrier phase estimate based on the at least one Doppler estimate and a carrier phase estimate produced by the phase locked loop to provide a selected charrier phase estimate;
mixing the local carrier signal with the third samples to generate third carrier-free signal samples, wherein the carrier phase of the local carrier signal is controlled based on the selected carrier phase estimate;
selecting between the code phase estimate based on the at least one Doppler estimate and a code phase estimate produced by a delay locked loop to provide a selected code phase estimate;
correlating the third carrier-free signal samples with the local spreading code to generate third complex-valued correlation results for the third epoch, wherein the code phase of the local spreading code is controlled based on the selected code phase estimate; and
processing the third complex-valued correlation results to produce at least one of: a third indication of whether the GNSS signal is detected or not; and a third GNSS measurement for the third epoch.

14. A non-transitory computer-readable medium comprising computer program code that, when executed by one or more computing devices, causes the one or more computing devices to perform operations comprising:
for a first epoch:
obtaining first samples of a Global Navigation Satellite System (GNSS) signal;
generating a local carrier signal;
mixing the local carrier signal with the first samples to generate first carrier-free signal samples;
generating a local spreading code;
correlating the first carrier-free signal samples with the local spreading code to generate first complex-valued correlation results for the first epoch; and
processing the first complex-valued correlation results to produce at least one of: a first indication of whether the GNSS signal is detected or not; and a first GNSS measurement for the first epoch,
wherein, during the mixing for the first epoch, a carrier phase of the local carrier signal is controlled to track a carrier phase of the GNSS signal using a phase locked loop, and
for a second epoch:
obtaining second samples of the GNSS signal,
obtaining at least one Doppler estimate for the GNSS signal, wherein the at least one Doppler estimate is based on inertial measurements made at a receiver,
mixing the local carrier signal with the second samples to generate second carrier-free signal samples;
correlating the second carrier-free signal samples with the local spreading code to generate second complex-valued correlation results for the second epoch; and
processing the second complex-valued correlation results to produce at least one of: a second indication of whether the GNSS signal is detected or not; and a second GNSS measurement for the second epoch,
wherein, during the mixing for the second epoch, the carrier phase of the local carrier signal is controlled based at least in part on the at least one Doppler estimate.

15. A Global Navigation Satellite System (GNSS) receiver configured to process a GNSS signal, the GNSS receiver comprising at least one processor and memory comprising instructions that, when executed by the at least one processor, causes the GNSS receiver to perform operations comprising:

for a first epoch:

obtain first samples of the GNSS signal;

generate a local carrier signal;

mix the local carrier signal with the first samples to generate first carrier-free signal samples;

generate a local spreading code;

correlate the first carrier-free signal samples with the local spreading code to generate first complex-valued correlation results for the first epoch; and process the first complex-valued correlation results to produce at least one of: a first indication of whether the GNSS signal is detected or not; and a first GNSS measurement for the first epoch, wherein, during the mixing for the first epoch, a carrier phase of the local carrier signal is controlled to track a carrier phase of the GNSS signal using a phase locked loop, and for a second epoch:

obtain second samples of the GNSS signal, obtain at least one Doppler estimate for the GNSS signal, wherein the at least one Doppler estimate is based on inertial measurements made at the receiver, mix the local carrier signal with the second samples to generate second carrier-free signal samples;

correlate the second carrier-free signal samples with the local spreading code to generate second complex-valued correlation results for the second epoch; and process the second complex-valued correlation results to produce at least one of: a second indication of whether the GNSS signal is detected or not; and a second GNSS measurement for the second epoch, wherein, during the mixing for the second epoch, the carrier phase of the local carrier signal is controlled based at least in part on the at least one Doppler estimate.

* * * * *